J. W. TYGARD.
INTERNAL COMBUSTION ENGINE.
APPLICATION FILED NOV. 5, 1912.

1,229,172.

Patented June 5, 1917.
5 SHEETS—SHEET 4.

WITNESSES:
Cyril Bracewell
Chas. Rhodes

INVENTOR
James Wallace Tygard

J. W. TYGARD.
INTERNAL COMBUSTION ENGINE.
APPLICATION FILED NOV. 5, 1912.

1,229,172.

Patented June 5, 1917.
5 SHEETS—SHEET 5.

WITNESSES:
C. Bracewell
Chas. R. Rhodes

INVENTOR
James Wallace Tygard

UNITED STATES PATENT OFFICE.

JAMES WALLACE TYGARD, OF PLAINFIELD, NEW JERSEY.

INTERNAL-COMBUSTION ENGINE.

1,229,172.     Specification of Letters Patent.     Patented June 5, 1917.

Application filed November 5, 1912. Serial No. 729,576.

*To all whom it may concern:*

Be it known that I, JAMES WALLACE TYGARD, a citizen of the United States, residing at 920 South avenue, in the city of Plainfield, county of Union, and State of New Jersey, have invented a new and useful Internal-Combustion Engine, of which the following specification, together with the annexed drawings, is such a description as will enable its construction to be clearly understood by those skilled in the art.

The objects of this my invention are:

First. In an internal combustion engine; and particularly the type of internal combustion engine described in my application for United States Letters Patent filed January twenty-eighth, 1903, Serial No. 140,903; to secure complete expansion of the combustible charge which is not possible in that or the ordinary type of four cycle engine.

Second. To secure greater economy in the fuel used in internal combustion engines by utilizing the terminal pressure, usually exhausted into the atmosphere, in driving the engine.

Third. To lessen vibration and secure better balance, retaining in a single cylinder the four cycle action and two cycle explosion effect or one power stroke every revolution of the engine.

Fourth. To produce an absolutely silent running engine both in its valve action and without any necessity of muffling its exhaust.

Fifth. To reduce the weight of internal combustion engines using oil, gas or gasolene as fuel by decreasing weight of flywheel usually necessary when power strokes intervene with pump, compression and exhaust strokes.

Sixth. To establish in an oil or gas engine a system of ignition independent of the electrical method usually employed.

Seventh. To greatly reduce the amount of cooling water used in an oil or gas engine to keep the moving surfaces at such temperature that they can be lubricated by separating the pump and compression spaces from the expansion and exhaust spaces in such manner as to allow either space to be separately cooled.

Eighth. To absolutely prevent pre-ignition or "back kick" by preventing the contact of the compressed charge with the means of igniting the same until the commencement of the stroke has been reached.

Ninth. To so arrange the cylinders of a divided-action oil or gas engine as to permit their power strokes to overlap and practically produce the power or constant torque effect of a six or eight cylinder single acting engine.

Tenth. To reduce the speed of a rotary valve in an engine in such manner as to prolong its life and allow it greater time to cool.

Eleventh. To simplify the number of parts and obviate the use of secondary or cam shafts in internal combustion engines.

Twelfth: To greatly reduce the cost of manufacture by simplifying the form of cylinder and other parts entering into the construction of such engines.

Thirteenth. To secure greater air cooling effect in an oil or gas engine by inclosing its cylinder in a casing and allowing its movement to produce a pump-like effect by which the heated air is continuously removed and renewed by cooler air.

Fourteenth. To more thoroughly vaporize the charge entering an engine by causing it to impinge upon a heated cylinder head surface after its compression instead of prior, as usually done, thereby increasing the total weight of the fuel charge entering the engine.

Fifteenth. To construct an internal combustion engine in such manner that its unignited compressed charges shall feed a stream of combustible mixture to supply a flame ignition to the said charges.

Sixteenth. To secure a combination of the flame and electrical methods of ignition in internal combustion engines.

Seventeenth. To so arrange the parts of an internal combustion engine that certain surfaces may attain and maintain incandescence without detriment to the engine thereby securing ignition from contact of the combustible charge with the heated surface.

Eighteenth. To secure a method of transferring compressed combustible charges in an internal combustion engine in such manner that the revolving transfer chamber may be efficiently cooled.

Nineteenth. To produce an engine adapted to use as fuel an explosive mixture of coal dust and air.

I obtain these the objects of my invention by means of mechanism illustrated and set forth in the accompanying drawings in which—

Referring to the drawings by letters; (A) designates a divided action recessed piston of differing diameters rigidly supported within the frame (B). This recessed fixed piston (A) is secured in place by a pair of trunnions (C C) which form the seat or bearing for the receiving and transfer valve (D) are integral with the piston, and project from its sides at diametrically opposite points and enter openings in the frame (B).

Inclosing this piston and working back and forth upon it and upon suitable slides (E) in the engine frame is a cylinder (F) with longitudinal slots (G) through which pass the stationary trunnions and valve seat (C) connecting the piston and the engine frame.

Figures 1, 2:
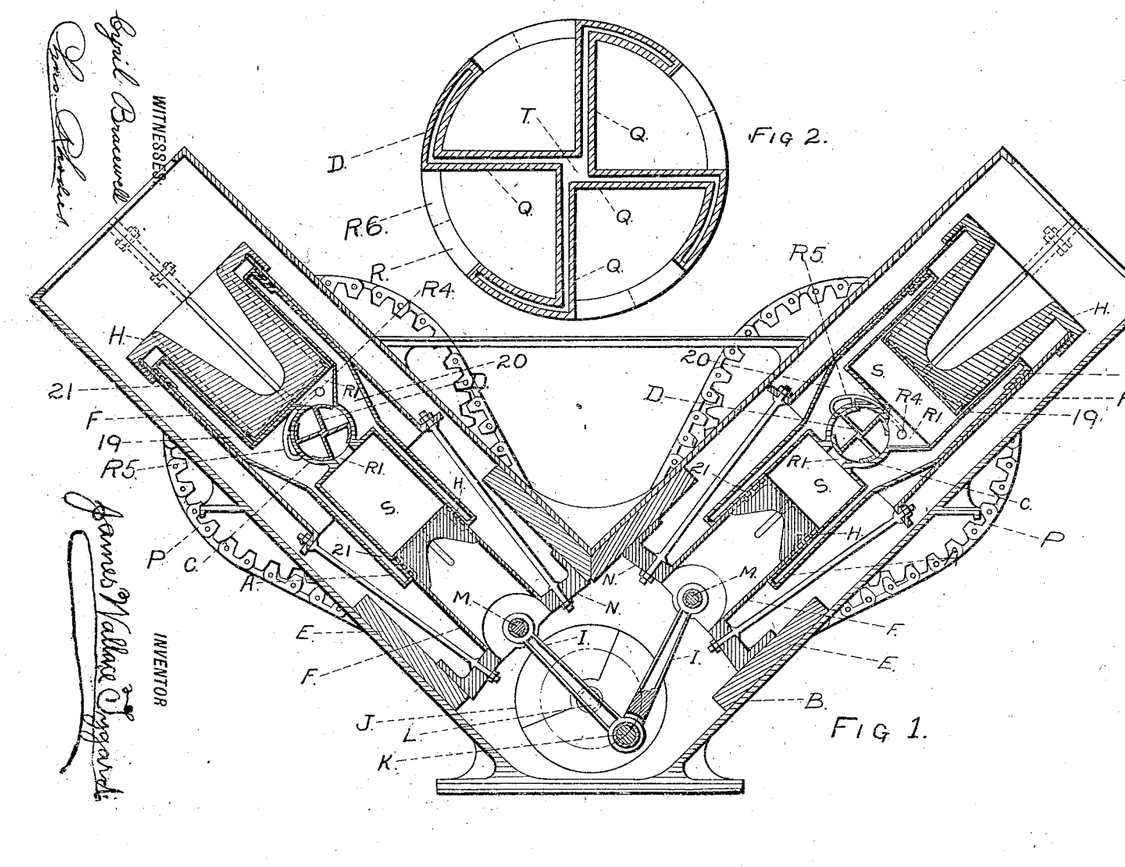
Figure 1 is a longitudinal section view of my divided-action complete expansion engine, as preferably arranged to secure explosion balance.
Fig. 2 is a transverse section of the valve, showing method of water cooling.

This cylinder, closed at both ends by suitable heads (H H), is shown in Fig. 1 as formed of two parts of differing diameter bolted together and moving upon and within the piston as a single structure.

A suitable pitman (I) connects the moving cylinder with the counterbalanced flywheel (J) and in the preferred type to secure explosion balance and power overlap shown in Fig. 1, the pitmen of twin engines are both connected to the crank pin (K), which connects the flywheels, forming the crank shaft (L). These pitmen are pivotally connected to the cylinder structure by the wrist pins (M M) passing through the cylinder head crossheads (N N).

A tubular valve D of the preferred conical shape, shown in U. S. Letters Patent granted to J. W. and P. L. Tygard dated February 7th, 1899, No. 619,004, on rotary internal combustion engines, and in my application for U. S. Letters Patent on double-action piston and valve filed Jan. 28, 1903, Serial No. 140903; and also in my allowed application for U. S. Letters Patent on rotary engine, pump or compressor filed March 8th, 1901, Serial No. 50382; is mounted to rotate in a transverse similarly shaped passage (O O) extending through the supporting trunnions (C C) and recessed pistons (A A). This valve is adapted to be rotated by suitable chain gearing (P P) driven from shaft (L) of the engine at a speed of one quarter the number of revolutions of the shaft.

This hollow valve (D D) is provided with longitudinal partitions (Q Q Q Q) and closed ends adapted to form four separate chambers or passages within the valve.

Two openings or ports ($R^6$ R) through the side of this valve into each of its four chambers communicate alternately as the valve is revolved with suitable corresponding ports ($R^1$—$R^1$) connecting the valve seat (C C) with the respective recesses (S—S) in the piston.

In oil engines of the Diesel type, embodying this system of divided-action and complete expansion, the receiving valve itself may be internally water-cooled and the passage for this water is shown between the partition and outer shell in Fig. 2, at (T). The port openings for suitable inlet and outlet water connections are shown in Fig. 4, at (U—U).

Figures 4, 10:
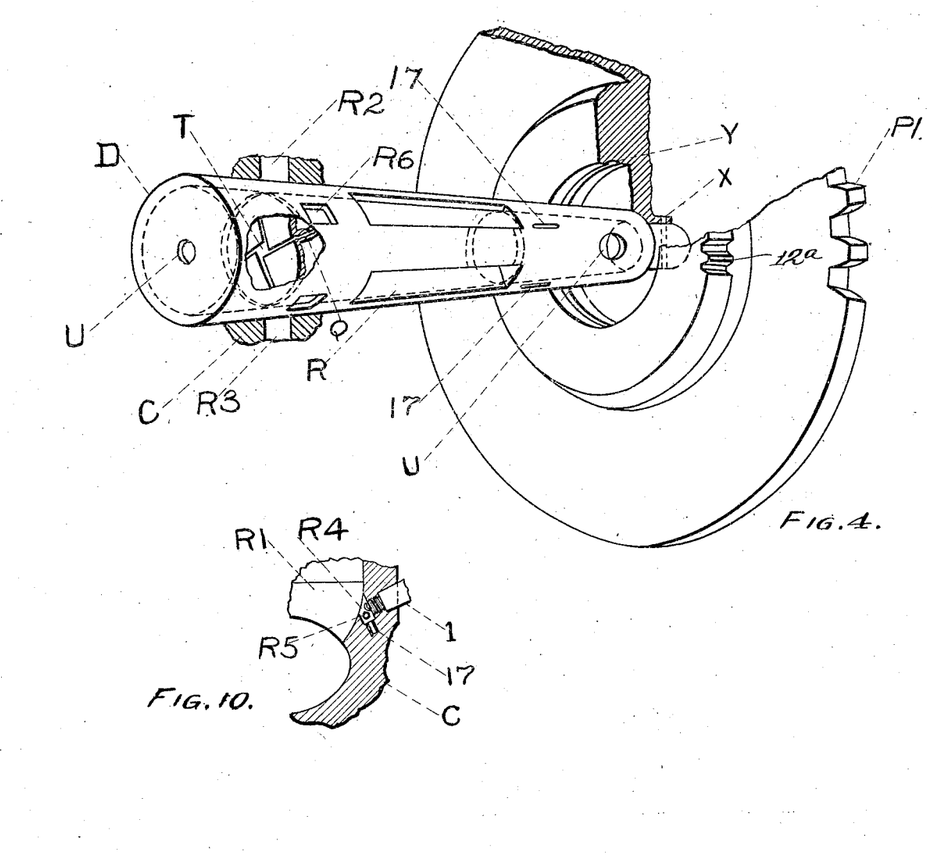
Fig. 4 is a view of the rotary transfer valve and its driving gear removed.
Fig. 10 is a fragmentary transverse sectional view of a portion of the same showing the ignition cavity.

In Fig. 4, the rotary transfer valve (D) is shown with its end broken to show, in connection with the receiving and water discharge ports (U—U), its interior water-cooling arrangement for maintaining the temperature of the valve and its interior receiving compartments at such temperature as will not affect its proper lubrication.

The valve ports ($R^6 R^6$) preferably placed at its large end are so proportioned in regard to the ports (R R) which co-act with piston ports ($R^1 R^1$) as to require but half the time to open and close as compared with the ports opening communication with the piston recesses (S—S).

A suitable chain or other gear wheel ($P^1$) drives the valve through the medium of a pin (X), preferably formed of copper or soft metal, passing through its hub and the valve shank thus forming a safety driving device which upon failure of the lubrication or other causes will shear off and stop the revolution of the valve without damage to its seat. The driving gear ($P^1$) may rotate upon a suitable ball-bearing (Y) placed upon the valve seat (C) so as to prevent side thrust upon the valve bearing.

The half-time valve ports ($R^6 R^6$) co-act during the valve's rotation with suitable ports ($R^2$) and ($R^3$) in the trunnion or valve seat (C) which lead respectively to the engine's fuel supply and exhaust passage.

Opening into the port ($R^1$) connecting the larger piston recess with the valve seat (C) is an ignition cavity ($R^4$) from which leads a suitable passage or pipe ($R^5$) with such suitably spaced openings into the valve seat (C) as to permit a continuous flow or passage of a minute portion of the combustible mixtures, compressed into the receiving chambers of the valve, into this ignition cavity.

This ignition and igniter cavity ($R^4$) may with certain forms of fuel be fitted to receive any suitable form of electrical device usually employed to secure ignition in internal combustion engines.

Figure 9:
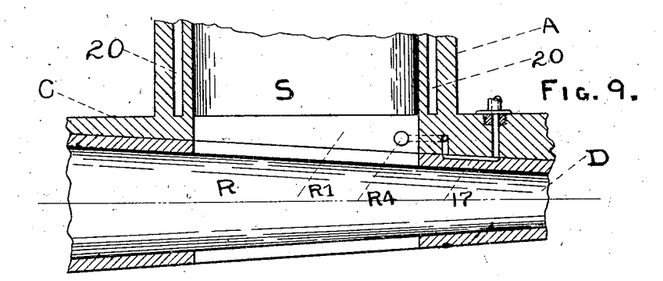
Fig. 9 is a central sectional view of the transverse valve shown in the first four figures and connected parts.

In oil engines of the Diesel type introducing the oil fuel under superior compression at the moment of ignition this cavity may be connected with the oil supply under such superior pressure (obtained by pump or other suitable means) as will by means of the four suitably timed ports Nos. (17 17) in the valve's surface, as shown in Figs. 4 and 9, allow the projection and consequent vaporization and ignition of the measured fuel charge into the heated air at the commencement of each power stroke.

When electrical ignition is employed the preferable form is a modification of the rotary igniter illustrated and described in my application for United States Letters Patent on rotary engine pump or compressor above recited. This modification is shown in detail in Fig. 8, in which (1) is a cylindrical barrel threaded into the igniter cavity ($R^4$) in the piston. Electrically insulated from this barrel by suitable insulators (2 2) is a chambered tube (3) carrying the movable electrode (4) arranged to make and break electrical contact with the stationary electrode (5) preferably formed of a ring of suitable non-corrodible metal brazed to the barrel (1). A suitable ball check valve (6) is located in a valve seat (7) formed in the central part of the chambered tube (3) to prevent escape of gases through the chambered tube.

Figure 8:
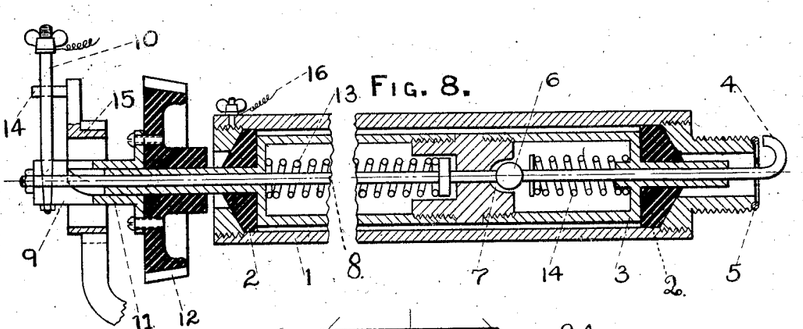
Fig. 8 is a sectional view of a modified form of rotary igniter for electrical ignition.

Mounted in the outer end of the chambered tube is a spring actuated plunger or striking rod (8) carrying at its outer end a spiral notched cam (9) and a cross bar (10) to which one wire of the electrical connections is attached.

By means of a suitable co-acting cam (11); through which the striking rod (8) passes, rotated by means of a gear $12^a$ rotating with the gear P' and driving the insulated gear (12) turning upon a bearing formed on the outer end of the chambered tube, at four times the speed of the receiving and transfer valve (D); this cam (9) is caused to rise gradually and as its projections meet the interrupted portion it will cause the cam and hammer rod (8) under pressure of the spring (13) to strike the ball check valve (6) knocking it from its seat and causing it to strike the electrode and break its contact producing a suitable igniting spark.

A spring causes this electrode to make electrical contact while the action of the cams is retracting the hammer rod (8) which is prevented from rotating by the adjustable stop 14 carried by the revoluble washer or plate (15).

Thus the valve's rotation can be arranged to revolve the notched spiral cam (11) so as to cause an igniting spark to occur at such suitable time in the igniting cavity as will ignite the compressed combustible charges as they are successively presented by the transfer valve (D). A suitable electrical current may be employed to produce the spark, the ground wire being shown at (16).

The recesses in the divided acting fixed piston are constructed of such differing proportionate cubic capacity as will allow such displacement by the cylinder heads entering the same; that; with a certain kind of fuel, the combustible mixture drawn into the smaller piston chamber or recess will; after its compression into the valve and transfer to the larger or ignition and exhaust chamber in the piston after its ignition; be completely expanded during the working stroke thus obviating the necessity for muffling the exhaust and greatly economizing the fuel.

The cycle of action in my oil and gas engine is as follows:

A suitable combustible fluid or vapor or air alone in certain types of my improved engine is introduced into the intake or charge inlet end, i. e. the smaller or pump end, and by means of the ports (R, $R^6$, $R^1$) is alternately introduced between the piston face and cylinder end when the cylinder is making its suction stroke. As the inlet port ($R^6$) in the valve end is only one-half the width of the inner or receiving port (R) co-acting with the piston ports ($R^2$ $R^2$) it opens and closes during this suction or pump stroke.

The succeeding or compression stroke forces the entire compressed charge into one of the four receiving chambers in the interior of the valve where it is imprisoned by the closing of the port at the end of the compression stroke.

The valve's rotation progressively and successively presents these compressions to the port ($R^1$) in the larger or expansion and exhaust recessed end of the piston at such time in the stroke of the cylinder that the cylinder head is about commencing its withdrawal from the piston recess.

At this point ignition of the compressed charge commencing to issue from the opening port is effected by either of the methods shown:

The continuously burning flame fed by the small by-pass (R⁵),

The electrical spark from the rotary igniter, (1),

The injection of oil into the heated compression (as in the Diesel type), or

The surface of the cylinder head (19) heated to incandescence as described in my application for United States Letters Patent filed July 14th, 1900, Serial No. 23,582.

During the expansion or work stroke the half-time port (R⁶) remains closed, starting to open as the larger cylinder head commences its return or exhaust stroke and closing at its end.

Thus the charges pumped into the smaller piston recess are successively compressed into the chambers of the revolving valve and by its rotation progressively delivered through the larger piston recess port past the igniting cavity (R⁴) located in this port and afterward as they are successively ignited expand and burn driving the engine until their pressure is reduced to that of the atmosphere into which they are expelled during the exhaust stroke.

Figure 7:
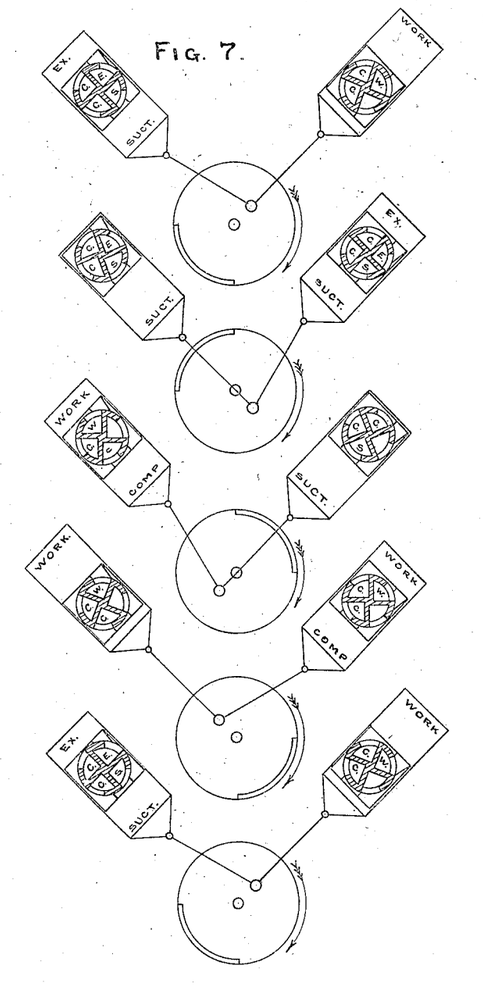
Fig. 7 is a cycle diagram of my divided action complete expansion oil and gas engine showing sequence of operations in the engine spaces and overlapping power strokes.

I have thus produced a new type of divided action oil and gas engine; which while using the four-cycle principle of a full stroke for each of the four parts of the cycle; suction, compression, work and exhaust; yet obtains in a single cylinder the two-cycle effect of a power stroke every revolution of the engine shaft as will be seen in Fig. 7.

The preferable construction to obtain the ninth object of my invention is shown in section in Fig. 1 in which two divided-acting engines are coupled to the power wheels and shaft by the connecting rods (I I) both mounted upon the crank pin (K).

The cycle diagram Fig. 7 shows the sequence of operation giving an overlap of one quarter revolution of the power strokes and an idle quarter revolution in which no power is developed during each revolution of the engine shaft.

Annular spaces around the recesses and valve seats in the fixed pistons for the circulation of the cooling medium are indicated in Fig. 1 at (20).

Both explosion and mechanical balance may be thus obtained.

Figure 5:
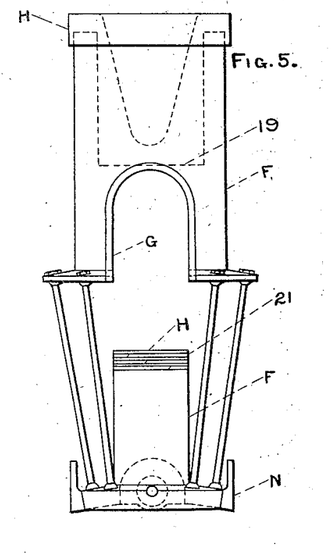
Fig. 5 is a view of the two-diameter cylinder removed, showing bolts connecting its heads to form an integral structure.
Figure 6:
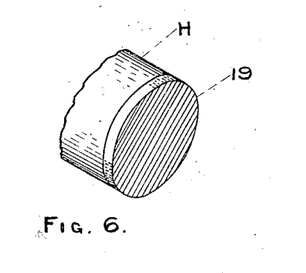
Fig. 6 is a view of the incandescent igniting surface.

In Fig. 5 the bolts connecting the upper and lower portions of the cylinder structure are indicated at 33.

While I have described the application of my divided-action fixed piston type of engine used to secure complete expansion in internal combustion engines using gas, oil, gasolene, distillate, alcohol, etc., as fuel; its peculiar construction; separating as it does the pump and compression chambers from the expansion and exhaust chambers, permitting a temperature approaching incandescence to be maintained in the expansion chamber; makes possible the use in an internal combustion engine of fuels of a type not hitherto possible to utilize in a gas engine.

Ordinary coal finely ground and powdered when mixed with sufficient oxygen to properly support combustion and introduced into the engine spaces after other suitable oil or gaseous fuel has raised the temperature in the expansion chamber to a suitable point, may be successfully used as a fuel for the production of power.

Figure 3:
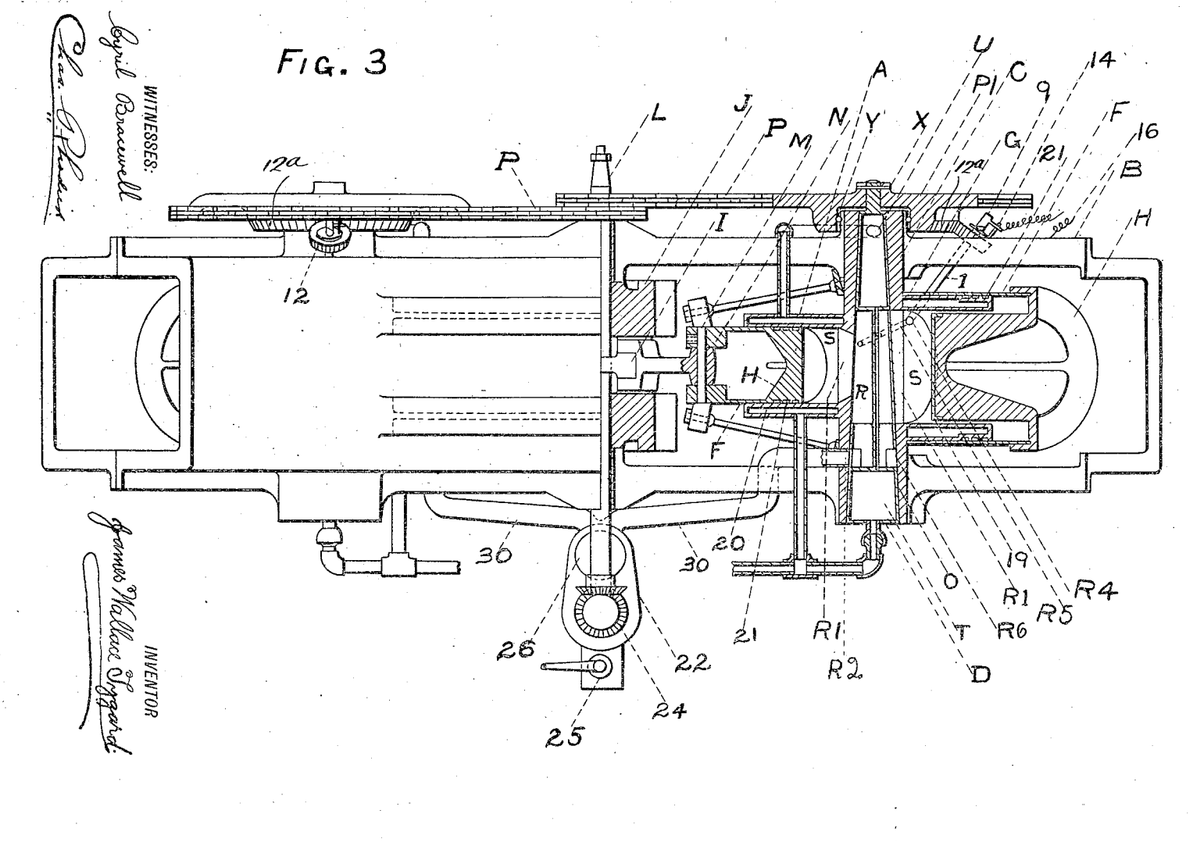
Fig. 3 is a plan view of the engine.

Such modification of my engine as will adapt it to use a mixture of coal dust and air is shown in Figs. 1 and 3 in which a carbon or other suitable fire-proof lining is placed upon the cylinder head surface entering the expansion recess of the fixed piston. This carbon lining (19) attains and maintains the heat of incandescence and performs the functions of an igniter to the compressed charges of coal dust and air as they are delivered from the chambered rotating valve. This type of ignition surface is also efficient with certain types of low grade oil fuel.

The fire pot or combustion space in the engine is located inside the piston, while the rubbing or sliding outside surface of the piston, packed with the usual type of sprung rings (21) permits the reciprocation of the cylinder tube and its proper lubrication, the cooling water circulating in the annular spaces in the piston walls (20), and preventing its outer surface from becoming unduly heated.

It will be apparent that a slight modification of this type of two-diameter fixed piston, moving cylinder and rotary valve engine structure; may, when driven by suitable applied power, form an efficient two-stage air compressor; the air being pumped into the larger piston recess, compressed into a receiving chamber in the valve and by it be transferred into the smaller piston recess to be further compressed and discharged into a suitable receiver.

Figure 11:
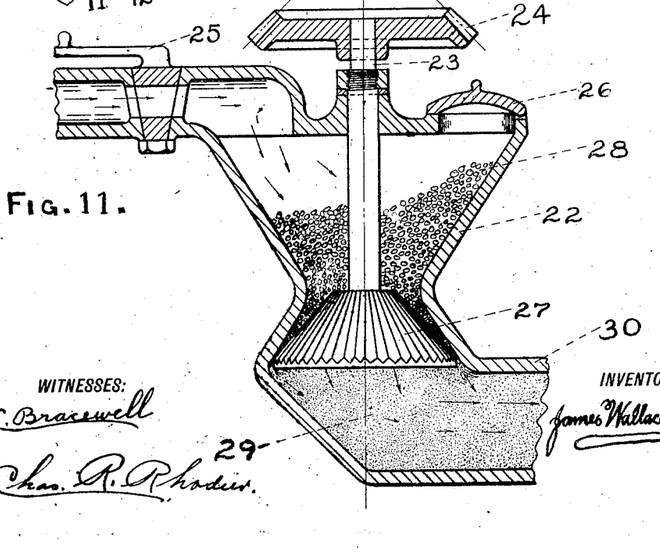
Fig. 11 is a sectional view of a modified carbureting device.

A modification of the carbureting device to produce an explosive combustible mixture from coal dust or other powdered carbonaceous fuels as used in my improved complete expansion divided-action engine is shown in Fig. 11, it being deemed unnecessary to show the ordinary types of carbureting devices which are applicable when gas or oil is used as fuel; a hopper shaped closed chamber (22) is connected to the suction inlet of the engine as shown in Fig. 3; a hinged cover (26) permits the coal or other suitable fuel in a proper size for further reduction to be introduced into this chamber. Mounted revolubly within this chamber is a suitable grinding member (23) with its corrugated surface (27) adapted to co-act with suitable fixed corrugations within the chamber during its rotation by a gear (24) meshing into a gear on the engine shaft, and reduce the fuel to an impalpable fineness; a suitable regulating valve (25) permits an accurate adjustment of the air entering the carbureter during the suction stroke, its course through the fuel being shown by the arrows; the explosive combustible mixture (29) thus produced enters the engine through the pipes (30).

As the admixture of the fuel particles and sufficient oxygen for their complete combustion is effected during the reduction of the fuel, in such quantity and at such time as the engine consumes them, its slow precipitation as a powder is prevented and a practically stable explosive combustible mixture obtained.

What I claim and desire to secure by Letters Patent is:

1. In an internal combustion engine the combination of a two faced fixed piston with recessed ends of different cubical content capacity; a cylinder with heads adapted to enter the piston recesses, and slidable upon said fixed piston and guides in the frame; a power wheel and shaft connected to the cylinder; a frame carrying the shaft and the fixed piston; a chambered valve within the piston; means for operating the valve and to cause it to admit and receive the combustible charges pumped into the small recess of the piston and transfer the compressed combustible charges to the larger piston recess and allow the exit of the exhaust after ignition and expansion; and a means for igniting the compressed combustible charges as they are delivered into the expansion recess of the piston.

2. An internal combustion engine comprising a frame; a cylinder; a piston with recessed ends forming respectively a pump space and an expansion space fixed in the frame; a combined cross-head and cylinder-head attached to a cylinder connecting it to a power wheel and shaft; a power wheel and shaft mounted in the frame; a rotary inlet and outlet receiving and transfer valve transversely located in said fixed piston, and means for rotating the valve to cause it to admit the combustible fuel charge into the pump space within the piston and to receive it after compression and transfer it to the expansion space at the opposite end of the piston; an igniter adapted to ignite the combustible as it is delivered from the valve.

3. The combination in an internal combustion engine of an engine frame; a two faced piston held fixedly in the frame; a valve seat or trunnion extending transversely from its sides, and with recessed ends and ports leading from the recessed ends into the trunnion valve seat; a ported, chambered valve located in the trunnion valve seat; a cylinder with slotted sides adapted to allow its reciprocation upon and within the fixed piston; cylinder heads adapted to close the cylinder ends and form a connection by which it is caused to travel upon the fixed piston; a power-wheel and shaft carried by the frame and adapted to be rotated by the movement of the cylinder; means for rotating the valve in such manner that the cycle of action usually occurring in an internal combustion engine is so divided that suction and compression of the charge is performed in one end of the cylinder and ignition, expansion and exhaust in the other end.

4. An oil engine comprising a frame; a power-wheel, pitman and shaft carried by the frame; a cylinder structure with closed ends and slotted sides, a pitman connecting one of its ends to the power wheel; a piston with recessed ends of differing capacity, held stationary in the frame and within the cylinder transverse lugs or trunnions extending from its sides through the cylinder slots into the frame, ports leading from its recessed ends into a valve seat located in the trunnion; ports in the trunnion for the fuel inlet and exhaust outlet and cooling medium; a valve located in the valve seat and driven from the shaft; chambers or recesses in the valve, ports through the valve into the chambers adapted to co-act with the piston ports, and with fuel and exhaust ports in the valve seat, an ignition cavity located in one of the piston ports; adapted to receive the fuel under pressure through ports registering with ports in the valve and passages leading to the fuel supply; whereby charges compressed into the valve's receiving chambers in one piston end recess are transferred into the opposite piston end recess, and successively ignited and expanded as the measured fuel supply is projected into the heated compressions.

5. In an internal combustion engine the combination of a frame; a fixed piston within the frame; a compound cylinder structure movable on and co-acting with the piston; a power shaft and wheel connected to the cylinder and actuated by it; a rotatable valve located within the piston and actuated from the shaft in such manner as to conduct the fuel supply into one of the cylinder spaces and transfer it after compression into the other and opposite cylinder space and a means whereby the transferred fuel charge is ignited.

6. A complete expansion divided-action fuel burning engine comprising a frame substantially V-shaped in vertical cross-section; a divided-action compound piston structure stationarily mounted in the frame; provided with recessed ends and supporting lugs or trunnions extending transversely from its sides forming a valve seat; annular spaces between the inner and outer piston walls and passages for the inlet and outlet of the cooling medium to the annular spaces; ports leading from the recessed piston ends into the valve seat and from the valve seat to the fuel supply and exhaust outlet; an ignition cavity in one of the piston ports adapted to receive an igniter; a passage in the piston leading from the valve seat to the ignition cavity; grooves adapted to receive packing rings on the pistons; a compound cylinder structure embracing and entering the piston and slidable upon it; introverted cylinder heads closing its ends adapted to enter the piston recesses alternately as the cylinder is reciprocated, a connecting rod pivotally attached to one of the cylinder heads, a power-wheel and shaft carried by the frame; connecting bolts joining the cylinder section to the compound cylinder head crosshead; a valve located in the valve seat in the fixed piston; a chain gear actuated from the shaft and adapted to rotate the valve separating the compression and expansion recesses in the piston; partitions in the valve dividing it into separate compartments, internal and annular spaces inside the valve body separate from its compartments; ports or passages leading from these internal spaces and co-acting with ports in the valve seat through which circulation of a cooling medium through the interior of the valve may be effected; means by which the valve's rotation may actuate an igniter and cause valve ports to register with those in the piston and valve seat; a make-and-break igniter, whereby the cycle of suction and compression is effected in one piston recess, while ignition, expansion and exhaust are simultaneously effected in the opposite piston recess.

7. A coal-dust burning engine structure comprising a frame carrying a power shaft and wheel; a compound, two-faced, recess-ended, ring packed, water cooled fixed piston mounted in the frame, a trunnion valve seat extending transversely through and across the piston and separating the pump recess from the combustion recess; ports in the piston and through the valve seat and from the recesses to said seat forming the coal dust and air fuel inlet in the pump recess and the exhaust outlet from the combustion recess in the piston; an electrical igniter in a cavity in the valve seat port in the combustion recess, adapted to ignite other than coal dust and air mixtures while engine is starting; a compound cylinder structure embracing the piston and movable upon it, one end of the cylinder structure closed by a cylinder head cross-head; pivotally connected to it and the power wheel and shaft and adapted to move in guides in the frame and actuate it; the other cylinder head flanged and ribbed for radiation and covered on its inner face by a carbon or similar fire resisting surface adapted to attain and maintain incandescence and a cylindrical multi-chambered and multi-parted water-cooled valve, with ports adapted to register and co-act during the valve's rotation with the ports in the piston and valve seat; and chain gearing whereby the valve is caused to revolve, actuating the electrical igniter and causing the valve to receive in its compartments the fuel charges of coal dust mixture pumped into the compression recess of the piston and transfer them under compression into the combustion piston recess where they are projected and ignited against the incandescent cylinder head facing and heated piston recess walls expanding during work stroke to be afterward expelled during the exhaust stroke through the ports in the piston, valve and frame.

8. In an internal combustion engine the combination of a frame substantially V shaped in design its arms projecting at right angles; a footed base; formed in halves and adapted to separate on lines parallel with its arms; a pair of counterbalanced fly wheels connected to shafts and to a crank pin common to both fly wheels; pitmen connecting the crank pin and a pair of engine structures mounted in the frame arms; the engine structures substantially duplicates, each comprising a compound cylinder structure to which one of the crank pin connecting rods is pivotally connected by a wrist pin in the cylinder's head and a piston; the cylinder head adapted to slide in guides in the frame and cause the attached cylinder structure to reciprocate on the divided-action piston which it embraces; the piston stationarily held in the frame by a trunnion valve seat extending from its sides; a partition or solid part near the center of the piston separating chambers or recesses in its ends; and through which partition the valve seat passes; annular spaces between the piston and recess walls for circulation of cooling water; packing rings and grooves near the upper end of the piston; ports through the partition connecting the recess and valve seat; an ignition cavity located in one of the ports; a branched gas passage leading from the valve seat into the ignition cavity; an igniter located in the cavity and adapted to be operated by the engine's rotation; an oil fuel pipe adapted to discharge oil and air under pressure through the cavity into the port in which it is located; the oil fuel pipe leading from the source of supply into the valve seat and thence to the cavity; whereby co-acting valve ports form a means of measuring the amount of oil introduced; ports through the valve seat connected to the air supply and exhaust outlet; and a carbureting device adapted to be connected to the supply port; water connections for the inlet and outlet of cooling medium in the piston and valve; a tapered valve located in the piston valve seat and carrying a chain gear by which it is rotated from the shaft; a safety pin passing through the gear and the valve shank adapted to cut off or shear off under undue strain; a bevel gear attached to the chain gear and adapted to drive a gear upon the igniter; a ball-bearing carried on the valve seat for the valve chain wheel adapted to take the pull of the chain from the valve seat; chambers within the valve; and internal spaces between the valve chambers for cooling water; ports through the valve surface into the chambers and the internal cooling spaces; ports in the valve surface adapted to form a connecting passage for the oil fuel and co-act with the ports in the piston and the valve seat and an ignition surface located upon the inner surface of the upper cylinder head and adapted to perfect the combustion of inflammable mixtures projected against it from the valve.

9. In an internal combustion engine, the combination of a frame, a shaft, a fly wheel on the shaft, a compound cylinder structure, a crank connecting the shaft with said cylinder structure, a piston, said cylinder being reciprocable and the piston stationary, the piston having a trunnion valve seat extending from its sides, a partition or solid part near the center of the piston separating it into chambers, said partition having ports connecting the chambers and valve seat, an ignition cavity located in one of the ports, a branched gas passage leading from the valve seat into the ignition cavity, an igniter located in the cavity and adapted to operate as the engine rotates, a pipe for liquid fuel adapted to discharge through the cavity into the port in which it is located, said pipe leading from a source of supply into the valve seat and thence into the cavity, said valve seat having supply and exhaust ports, a carbureting device adapted to be connected to the supply port, a valve located in the piston valve seat adapted to be rotated from said shaft, said valve having chambers therein and ports adapted to form a connecting passage for the liquid fuel and to coact with the ports in the piston and valve seat for measuring the amount of liquid fuel introduced, and an ignition surface located upon the inner surface of the cylinder head for perfecting the combustion of inflammable mixtures projected against it from the valve.

10. A complete expansion divided action fuel burning engine comprising a frame, a compound piston structure mounted in stationary position therein and provided with recessed ends and supporting lugs or trunnions extending transversely from its sides and forming a valve seat, and having ports leading from the recessed piston ends into the valve seat and from the valve seat to a fuel supply inlet and exhaust outlet, an ignition cavity in one of the piston ports adapted to receive an igniter, a piston having a passage leading from the valve seat to the ignition cavity, a compound cylinder structure embracing and entering the piston and slidable upon it, introverted cylinder heads at its ends adapted to enter the piston recesses alternately as the cylinder is reciprocated, a valve located in the valve seat in the fixed piston, means for rotating the valve, said valve having partitions dividing it into separate compartments, an igniter, means by which the igniter is actuated by the rotation of the valve, and means whereby the suction and the compression are effected in one piston recess while ignition, expansion and exhaust are simultaneously effected in the other piston recess.

11. The combination in an internal combustion engine of an engine frame, a two faced piston held fixedly in said frame, a valve seat or trunnion extending transversely from the sides of said piston, the piston having recessed ends and ports leading from the recessed ends into the trunnion valve seat; a ported chambered valve located in the trunnion valve seat, a cylinder within the fixed piston having cylinder heads adapted to close the ends thereof, a power wheel and shaft adapted to be rotated by the movement of the cylinder, and means for rotating the valve to produce suction and compression of the charge in one end of the cylinder, and ignition, expansion and exhaust in the other end.

12. In an internal combustion engine the combination of a piston and cylinder relatively reciprocable, each having two relatively fixed parts of different diameters, the two parts of the piston being spaced apart, a chambered valve located in the space between said parts, means for compressing a charge in the smaller of said two parts and forcing it into a chamber of said valve, means for turning the valve to allow the compressed charge to enter the larger of said parts, and means for thereafter igniting it in said larger part.

In testimony whereof I have hereunto set my hand, in the presence of two subscribing witnesses.

JAMES WALLACE TYGARD.

Witnesses:
CYRIL BRACEWELL,
CHAS. R. RHODIER.